(12) United States Patent
Thisdale

(10) Patent No.: US 6,695,388 B1
(45) Date of Patent: Feb. 24, 2004

(54) AWNING DEVICE, KIT AND METHOD OF USING

(76) Inventor: Marc Thisdale, 858 12 Rue, St. Jérome, QC (CA), J7Z 3B6

(*) Notice: Subject to any disclaimer, the term of this patent is extended or adjusted under 35 U.S.C. 154(b) by 0 days.

(21) Appl. No.: 10/402,430

(22) Filed: Mar. 28, 2003

(51) Int. Cl.$^7$ ............................................. B60R 15/00
(52) U.S. Cl. ...................... 296/163; 296/161; 296/165
(58) Field of Search ................................ 296/163, 161, 296/165, 159, 169, 170, 160; 135/88.13, 88.1, 88.05; 160/235, 395, 22, 67

(56) References Cited

U.S. PATENT DOCUMENTS

| | | | | |
|---|---|---|---|---|
| 3,623,765 A | * | 11/1971 | Bowen | 296/161 |
| 3,737,190 A | * | 6/1973 | Smith et al. | 135/88.13 |
| 4,222,604 A | * | 9/1980 | Human | 296/165 |
| 4,310,194 A | * | 1/1982 | Biller | 296/159 |
| 4,720,135 A | * | 1/1988 | Farina | 296/161 |
| 4,858,986 A | * | 8/1989 | Whitley et al. | 296/163 |
| 4,909,296 A | * | 3/1990 | Sellke et al. | 160/235 |
| 4,918,772 A | * | 4/1990 | Haile | 296/169 |
| 4,976,487 A | * | 12/1990 | Ramos et al. | 296/163 |
| 5,002,111 A | * | 3/1991 | Boiteau | 160/395 |
| 5,018,778 A | * | 5/1991 | Goble | 296/161 |
| 5,143,417 A | * | 9/1992 | Philley et al. | 296/170 |
| 5,407,007 A | * | 4/1995 | Lowrey | 160/22 |
| 5,423,506 A | * | 6/1995 | Spoon | 296/163 |
| 5,660,425 A | * | 8/1997 | Weber | 296/163 |
| 5,700,048 A | * | 12/1997 | Wade et al. | 296/163 |
| 5,896,908 A | * | 4/1999 | Kaun | 160/67 |
| 5,961,176 A | * | 10/1999 | Tilly | 296/165 |
| 6,021,835 A | * | 2/2000 | Malott | 135/88.1 |
| 6,131,990 A | * | 10/2000 | Crean | 296/163 |
| 6,209,944 B1 | * | 4/2001 | Billiu et al. | 296/160 |
| 6,223,760 B1 | * | 5/2001 | Hughey | 135/88.05 |
| 6,283,536 B1 | * | 9/2001 | Muzyka et al. | 296/165 |
| 6,598,612 B1 | * | 7/2003 | Crowe | 296/163 |
| 2003/0094833 A1 | * | 5/2003 | Thompson et al. | 296/163 |
| 2003/0146646 A1 | * | 8/2003 | Cervenka | 296/165 |

* cited by examiner

Primary Examiner—Kiran Patel

(57) ABSTRACT

An awning device, an associated kit and an associated method of using the kit to assemble the device for use as an auxiliary rain shield over a sleeping unit slidably attached to a recreational camping vehicle are disclosed. The device includes the interconnected components of two pair of securing brackets, a pair of corner posts, a generally rectangular sheet, a primary adhesive strip, and a complementary adhesive strip. The interconnected components of the device make up the auxiliary rain shield over the sleeping unit which provides the sleeping unit additional protection from water damage. The kit includes the unassembled components of the device. The method of using the kit includes the steps of adjoining, affixing, aligning, connecting, extending, hooking, mounting, obtaining, and screwing.

19 Claims, 3 Drawing Sheets

AWNING DEVICE, KIT AND METHOD OF USING

FIELD OF THE INVENTION

The present invention relates to ultraviolet ray, debris and rain protection devices, more particularly, to an awning device, an associated kit and a method of using the kit to assemble and use an auxiliary rain shield over a sleeping unit slidably attached to a recreational camping vehicle.

DESCRIPTION OF THE PRIOR ART

Many relatively new mobile homes, recreational vehicles or the like are provided with a large rectangular opening in one side wall thereof in which a box-like enclosure commonly referred to as a "slide-out unit" is disposed for slidable movement between a retracted and extended position. When the slide-out unit is extended, it forms a perpendicular extension from the side wall of the mobile home, thereby enlarging the internal usable space. When the unit is retracted, it is drawn into the interior of the mobile home and the unit is normally only retracted when the mobile home is transported. When the slide-out unit is retracted, an outer wall of the slide-out unit, which is parallel with the side wall in which the unit is mounted, becomes coplanar with the side wall. One problem with slide-out units has resided in the fact that many of these have canvas roofs that are prone to leaking during wet weather when a user touches the interior surface of the canvas roofs. Another problem with slide-out units is that debris such as leaves, blowing trash and the like will frequently collect on the top of the slide-out unit while the unit is extended, and when the unit is retracted into the interior of the mobile home, the debris is also brought into the interior.

A wide variety of awnings is currently available on the commercial market and an even larger number of these types of devices are known in the art of awnings, for example, the awning for travel trailers and/or mobile homes disclosed by Duda in U.S. Pat. No. 3,324,869; the camping trailer disclosed by Bontrager in U.S. Pat. No. 3,377,098; the cantilevered camping vehicle bed construction disclosed by Bowen in U.S. Pat. No. 3,680,908; the locking mechanism for slide-out room cover disclosed by Becker in U.S. Pat. No. 5,752,536; the retractable awning for recreational vehicle or the like disclosed by Murray and Marasco in U.S. Pat. No. 5,860,440; the slide-out disclosed by Brutsaert in U.S. Pat. No. 6,269,824; and the convertible top for fire engines disclosed by Walthers, Sr. in U.S. Pat. No. D207, 309. requirements, the aforementioned patents do not describe interconnected components of two pair of securing brackets, a pair of corner posts, a generally rectangular sheet, a primary adhesive strip, and a complementary adhesive strip. This combination of elements would specifically match the user's particular individual needs of making it possible to provide a means for protecting a sleeping unit against water damage caused by rain. The above-described patents make no provision for these interconnected components of two pair of securing brackets, a pair of corner posts, a generally rectangular sheet, a primary adhesive strip, and a complementary adhesive strip.

Therefore, a need exists for a new and improved awning device having the interconnected components of two pair of securing brackets, a pair of corner posts, a generally rectangular sheet, a primary adhesive strip, and a complementary adhesive strip. In this respect, the awning device according to the present invention substantially departs from the conventional concepts and designs of the prior art, and in doing so provides an apparatus primarily developed for the purpose of providing a means for protecting a sleeping unit against water damage caused by rain.

SUMMARY OF THE INVENTION

The present device, kit and method of using, according to the principles of the present invention, overcomes the shortcomings of the prior art by providing a awning device, an associated kit and method of using the kit to assemble the device. The device includes the interconnected components of two pair of securing brackets, a pair of corner posts, a generally rectangular sheet, a primary adhesive strip, and a complementary adhesive strip. The interconnected components of the device make up the auxiliary rain shield over the sleeping unit which provides the sleeping unit additional protection from water damage. The kit includes the unassembled components of the device. The method of using the kit includes the steps of adjoining, affixing, aligning, connecting, extending, hooking, mounting, obtaining, and screwing.

In view of the foregoing disadvantages inherent in the known type awning devices now present in the prior art, the present invention provides an improved awning device, which will be described subsequently in great detail, is to provide a new and improved awning device which is not anticipated, rendered obvious, suggested, or even implied by the prior art, either alone or in any combination thereof.

To attain this, the present invention essentially comprises a the interconnected components of two pair of securing brackets, a pair of corner posts, a generally rectangular sheet, a primary adhesive strip, and a complementary adhesive strip. The interconnected components of the device make up the auxiliary rain shield over the sleeping unit which provides the sleeping unit additional protection from water damage.

There has thus been outlined, rather broadly, the more important features of the invention in order that the detailed description thereof that follows may be better understood, and in order that the present contribution of the art may be better appreciated.

The invention may also include a plurality of screw attaching together the securing brackets to the sleeping unit. There are of course, additional features of the invention that will be described hereinafter and which will form the subject matter of the claims attached.

Numerous objects, features and advantages of the present invention will be readily apparent to those of ordinary skill in the art upon reading of the following detailed description of presently preferred, but nonetheless illustrative, embodiments of the present invention when taken in conjunction with the accompany drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved awning device that has all the advantages of the prior art awning device and none of the disadvantages.

It is another object of the present invention to provide a new and improved awning device that may be easily and efficiently manufactured and marketed.

An even further object of the present invention is to provide a new and improved awning device that has a low cost of manufacture with regard to both materials and labor, and which accordingly is then susceptible of low prices of sale to the consuming public, thereby making such multi-purpose storage unit and system economically available to the buying public.

Still another object of the present invention is to provide a new awning device that provides in the apparatuses and methods of the prior art some of the advantages thererof, while simultaneously overcoming some of the disadvantages normally associated therewith.

Even still another object of the present invention is to provide a awning device having the interconnected components of two pair of securing brackets, a pair of corner posts, a generally rectangular sheet, a primary adhesive strip, and a complementary adhesive strip. This combination of elements makes it possible to provide a means for protecting a sleeping unit against water damage caused by rain.

Still another object of the present invention is to provide a kit comprising the unassembled components of the device.

Lastly, it is an object of the present invention to provide a new and improved method of using comprising the steps of adjoining, affixing, aligning, connecting, extending, hooking, mounting, obtaining, and screwing.

Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and description matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various figures.

DETAILED DESCRIPTION OF THE PREFERRED EMBODIMENT

Figure 1:
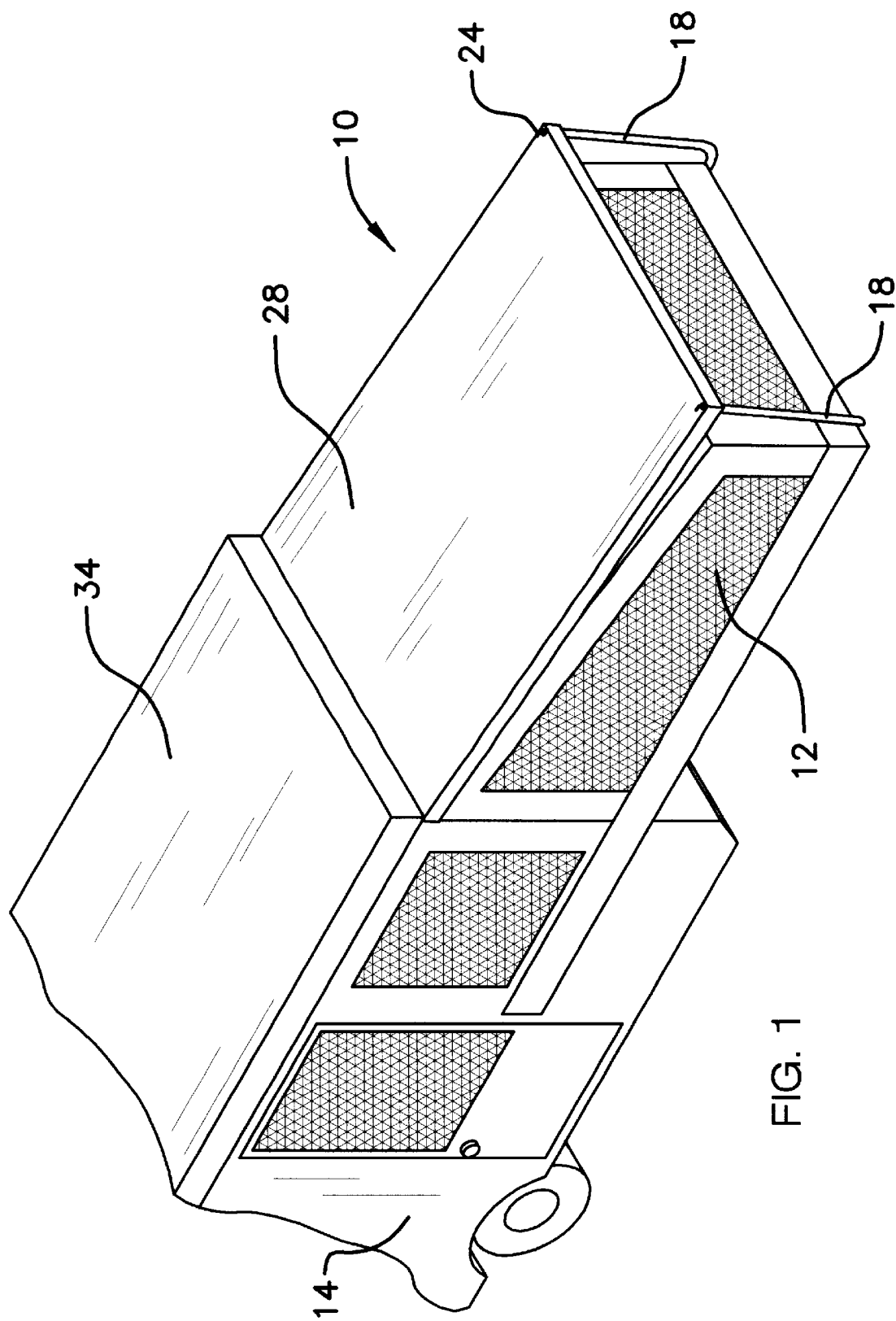
FIG. 1 is a perspective view of an preferred embodiment of the awning device constructed in accordance with the principles of the present invention.

Referring now to the drawings, and in particular FIGS. 1 to 4 thereof, one preferred embodiment of the present invention is shown and generally designated by the reference numeral 10. One preferred embodiment of an awning device 10 for use as an auxiliary rain shield over a sleeping unit 12 slidably attached to a recreational camping vehicle 14, the device 10 comprising: two pair of securing brackets 16, a pair of corner posts 18, a generally rectangular sheet 28, a primary adhesive strip 30, and a complementary adhesive strip 32. The two pair of securing brackets 16 are attached to a bottom platform of the sleeping unit 12 of the recreational camping vehicle 14. The pair of corner posts 18 is attached to the two pair of securing brackets 16, each corner post 18 having a flattened distal end 20, a clip 22 attached to a middle portion, a hooked proximate end 24, and an elbow 26 in the middle portion. The generally rectangular sheet 28 has a pair of adjacent corners attached to the hooked proximate ends 24 of the pair of corner posts 18. The primary adhesive strip 30 is attached to an edge of the sheet 28. The complementary adhesive strip 32 is attached to a portion of a roof 34 of the recreational camping vehicle 14, wherein the complementary adhesive strip 32 is reversibly attached to the primary adhesive strip 30.

Another preferred embodiment of the device 10 consists essentially of two pair of securing brackets 16, a pair of corner posts 18, a generally rectangular sheet 28, a primary adhesive strip 30, and a complementary adhesive strip 32.

An optional plurality of screws 36 may be added to the device 10 in which the optional plurality of screws 36 is attaching together the two pair of securing brackets 16 to the bottom platform of the sleeping unit 12 of the recreational camping vehicle 14.

An optional eyelet 38 may be added to the device 10 in which the optional eyelet 38 is attached to the sheet 28.

An optional nylon cap 40 may be added to the device 10 in which the optional nylon cap 40 is attached over a portion of the hooked proximate end 24.

An optional wood plug 42 may be added to the device 10 in which the optional plug 42 attached to a portion of the hooked proximate end 24.

The configuration of the primary and complementary adhesive strips (30 and 32, respectively) of the device 10 may be any commercially available adhesive strips. One preferred configuration of the primary and complementary adhesive strips (30 and 32, respectively) is that the primary adhesive strip 30 having an exposed surface composed of a plurality of minuscule loops, and the complementary adhesive strip 32 having a contact surface composed of a plurality of minuscule hooks, wherein when the exposed surface of the primary adhesive strip 30 touches the contact surface of the complementary adhesive strip 32 then a portion of the plurality of minuscule hooks interlocks together with a portion of the minuscule loops, whereby locking together the primary adhesive strip 30 to the complementary adhesive strip 32. Another preferred configuration of the primary and complementary adhesive strips (30 and 32, respectively) is that the primary adhesive strip 30 having an exposed surface composed of a plurality of minuscule hooks, and the complementary adhesive strip 32 having a contact surface composed of a plurality of minuscule loops, wherein when the exposed surface of the primary adhesive strip 30 touches the contact surface of the complementary adhesive strip 32 then a portion of the plurality of minuscule hooks interlocks together with a portion of the minuscule loops, whereby locking together the primary adhesive strip 30 to the complementary adhesive strip 32.

The sheet 28 of the device 10 may be any commercially available sheet 34. A most preferred configuration of the sheet 28 is that it is water proof 34. Another preferred configuration of the sheet 28 comprises a canvas sheet 28. Yet another preferred configuration of the sheet 28 comprises a polymeric material selected from the group consisting of rubber, neoprene, polyvinyl chloride, polyester, polypropylene, polyurethanes, polyacryls, polymethacryls, cellulosic polymers, styrene-acryl copolymers, polystyrene-polyacryl mixtures, polysiloxanes, urethane-acryl copolymers, siloxane-urethane copolymers, polyurethane-polymethacryl mixtures, silicone-acryl copolymers, vinyl acetate polymers, and mixtures thereof.

One preferred embodiment of a kit for assembling an awning device 10 for use as an auxiliary rain shield over a sleeping unit 12 slidably attached to a recreational camping vehicle 14, the kit comprising: two pair of securing brackets 16, a pair of corner posts 18, a generally rectangular sheet 28, a primary adhesive strip 30, and a complementary adhesive strip 32. Each corner post 18 has a flattened distal end 20, a clip 22 attached to a middle portion, a hooked proximate end 24, and an elbow 26 in the middle portion. The complementary adhesive strip 32 is reversibly attachable to the primary adhesive strip 30.

Another preferred embodiment of the kit consist essentially of: two pair of securing brackets 16, a pair of corner posts 18, a generally rectangular sheet 28, a primary adhesive strip 30, and a complementary adhesive strip 32.

An optional plurality of screws 36 may be added to the kit.

The configuration of the primary and complementary adhesive strips (30 and 32, respectively) of the kit may be any commercially available adhesive strips. One preferred configuration of the primary and complementary adhesive strips (30 and 32, respectively) is that the primary adhesive strip 30 having an exposed surface composed of a plurality of minuscule loops, and the complementary adhesive strip 32 having a contact surface composed of a plurality of minuscule hooks, wherein when the exposed surface of the primary adhesive strip 30 touches the contact surface of the complementary adhesive strip 32 then a portion of the plurality of minuscule hooks interlocks together with a portion of the minuscule loops, whereby locking together the primary adhesive strip 30 to the complementary adhesive strip 32. Another preferred configuration of the primary and complementary adhesive strips (30 and 32, respectively) is that the primary adhesive strip 30 having an exposed surface composed of a plurality of minuscule hooks, and the complementary adhesive strip 32 having a contact surface composed of a plurality of minuscule loops, wherein when the exposed surface of the primary adhesive strip 30 touches the contact surface of the complementary adhesive strip 32 then a portion of the plurality of minuscule hooks interlocks together with a portion of the minuscule loops, whereby locking together the primary adhesive strip 30 to the complementary adhesive strip 32.

The sheet 28 of the kit may be any commercially available sheet 34. A most preferred configuration of the sheet 28 is that it is water proof 34. Another preferred configuration of the sheet 28 comprises a canvas sheet 28. Yet another configuration of the sheet 28 comprises a polymeric material selected from the group consisting of rubber, neoprene, polyvinyl chloride, polyester, polypropylene, polyurethanes, polyacryls, polymethacryls, cellulosic polymers, styrene-acryl copolymers, polystyrene-polyacryl mixtures, polysiloxanes, urethane-acryl copolymers, siloxane-urethane copolymers, polyurethane-polymethacryl mixtures, silicone-acryl copolymers, vinyl acetate polymers, and mixtures thereof.

A preferred embodiment of a method of using a kit for assembling an awning device 10 for use as an auxiliary rain shield over a sleeping unit 12 slidably attached to a recreational camping vehicle 14, the method comprising the steps of: adjoining, affixing, aligning, connecting, extending, hooking, mounting, obtaining, and screwing. The obtaining step comprises obtaining the kit comprising: two pair of securing brackets 16; a pair of corner posts 18, each corner post 18 having a flattened distal end 20, a clip 22 attached to a middle portion, a hooked proximate end 24; and an elbow 26 in the middle portion; a generally rectangular sheet 28; a primary adhesive strip 30; a complementary adhesive strip 32, wherein the complementary adhesive strip 32 is reversibly attachable to the primary adhesive strip 30; and a plurality of screws 36. The extending step comprises extending outwardly the sleeping unit 12 from the recreational camping vehicle 14 by sliding out the sleeping unit 12 from the recreational camping vehicle 14. The aligning step comprises aligning the two pair of securing brackets 16 onto a bottom platform of the extended sleeping unit 12 of the recreational camping vehicle 14. The screwing step comprises screwing on the aligned two pair of securing brackets 16 onto the bottom platform of the extended sleeping unit 12 with the plurality of screws 36. The mounting step comprises mounting the pair of corner posts 18 onto the screwed on two pair of securing brackets 16. The affixing step comprises affixing the complementary adhesive strip 32 to a portion of a roof 34 of the recreational camping vehicle 14. The adjoining step comprises adjoining together the primary adhesive strip 30 to the sheet 28. The connecting step comprises connecting together the affixed complementary adhesive strip 32 to the adjoined primary adhesive strip 30. The hooking step comprises hooking together the hooked proximate ends 24 of the mounted pair of corner posts 18 onto the sheet 28.

An optional additional set of steps may be added to the method further comprising the steps of disconnecting, folding, inserting, slipping, storing, stowing, and unhooking. The disconnecting step comprises disconnecting the affixed complementary adhesive strip 32 from the adjoined primary adhesive strip 30. The unhooking step comprises unhooking the hooked proximate ends 24 of the mounted pair of corner posts 18 from the sheet 28. The folding step comprises folding up the sheet 28. The slipping step comprises slipping off the pair of corner posts 18 from the two pair of mounting brackets 16. The storing step comprises storing the slipped off pair of corner posts 18 in a storage area in the recreational camping vehicle 14. The stowing step comprises stowing the folded up sheet 28 in the storage area in the recreational camping vehicle 14. The inserting step comprises inserting slidably the sleeping unit 12 into the recreational camping vehicle 14 by sliding the sleeping unit 12 into the recreational camping vehicle 14.

Another preferred embodiment of the method consist essentially of the steps of adjoining, affixing, aligning, connecting, extending, hooking, mounting, obtaining, and screwing.

Still another preferred embodiment of the method consist essentially of the steps inserting, mounting, obtaining, screwing, slipping, storing, stowing, and unhooking.

Referring now to FIG. 1 which depicts a perspective view of an preferred embodiment of the awning device 10 showing the awning device 10 used as an auxiliary rain shield over a sleeping unit 12 which is slidably attached to a recreational camping vehicle 14. The device 10 is shown having a pair of corner posts 18, and a generally rectangular sheet 28.

Figure 2:
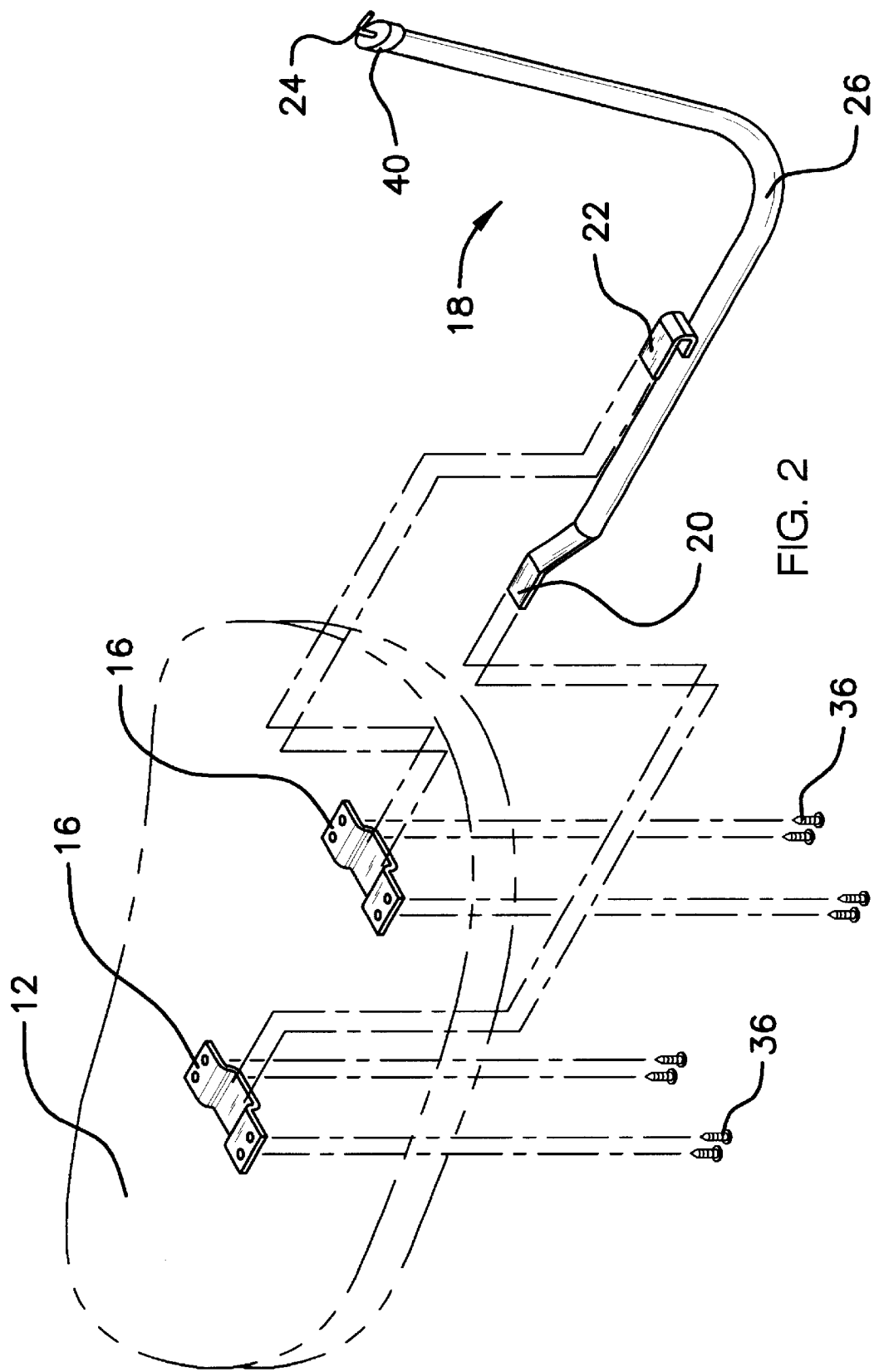
FIG. 2 is a perspective expanded view of a portion of a preferred embodiment of the awning device of the present invention.

Referring now to FIG. 2, which depicts a perspective expanded view of a portion of a preferred embodiment of the awning device 10 showing a pair of securing bracket 16, a corner post 18 and a plurality of screws 36. The corner post 18 is shown having a flattened distal end 20, a clip 22 attached to a middle portion, a hooked proximate end 24, and an elbow 26 in the middle portion.

Figure 3:
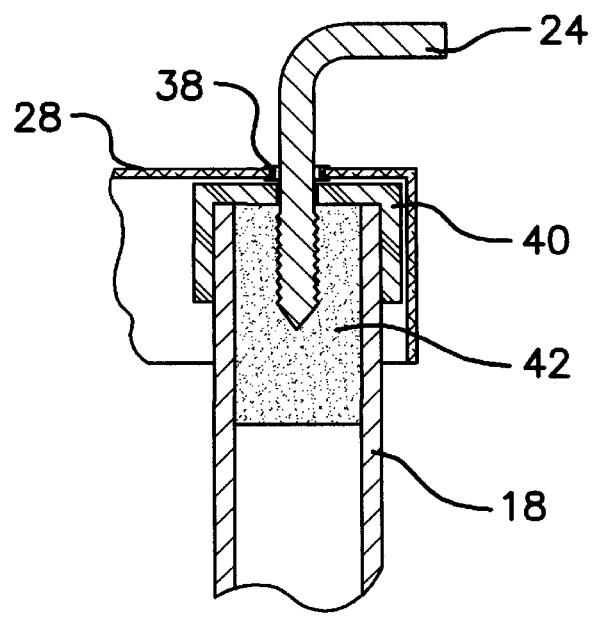
FIG. 3 is a cross sectional side view of a portion of a preferred embodiment of the awning device of the present invention.

Referring now to FIG. 3, which depicts a cross sectional side view of a portion of a preferred embodiment of the awning device 10 showing a corner posts 18 and a generally Also shown is an optional wood plug 42 attached to a portion of the hooked proximate end 24. The generally rectangular sheet 28 is shown attached to the hooked proximate end 24 of one of the corner posts 18. The optional eyelet 38 is shown attached to the sheet 28.

Figure 4:
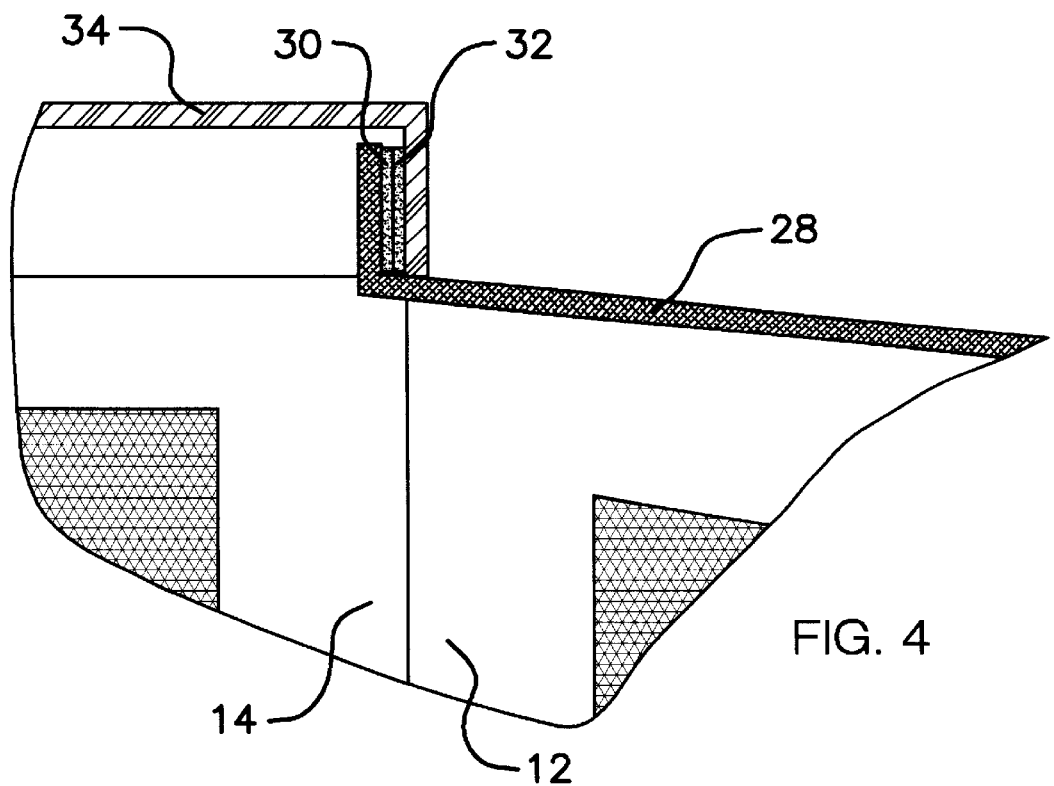
FIG. 4 is a cross sectional side view of a portion of a preferred embodiment of the awning device of the present invention.

Referring now to FIG. 4, which depicts a cross sectional side view of a portion of a preferred embodiment of the awning device 10 showing a generally rectangular sheet 28, a primary adhesive strip 30, and a complementary adhesive strip 32. The primary adhesive strip 30 is shown attached to an edge of the sheet 28. The complementary adhesive strip 32 is shown attached to a portion of a roof 34 of the recreational camping vehicle 14, wherein the complementary adhesive strip 32 is shown reversibly attached to the primary adhesive strip 30.

As to the manner of usage and operation of the present invention, the same should be apparent from the above description. Accordingly, no further discussion relating to the manner of usage and operation will be provided.

While a preferred embodiment of the awning device has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Throughout this specification, unless the context requires otherwise, the word "comprise"or variations such as "comprises" or "comprising" or the term "includes" or variations, thereof, or the term "having" or variations, thereof will be understood to imply the inclusion of a stated element or integer or group of elements or integers but not the exclusion of any other element or integer or group of elements or integers. In this regard, in construing the claim scope, an embodiment where one or more features is added to any of the claims is to be regarded as within the scope of the invention given that the essential features of the invention as claimed are included in such an embodiment.

Those skilled in the art will appreciate that the invention described herein is susceptible to variations and modifications other than those specifically described. It is to be understood that the invention includes all such variations and modifications which fall within its spirit and scope. The invention also includes all of the steps, features, compositions and compounds referred to or indicated in this specification, individually or collectively, and any and all combinations of any two or more of said steps or features.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An awning device for use as an auxiliary rain shield over a sleeping unit slidably attached to a recreational camping vehicle, said device comprising:

two pair of securing brackets attached to a bottom platform of the sleeping unit of the recreational camping vehicle;

a pair of corner posts attached to said two pair of securing brackets, each corner post having a flattened distal end, a clip attached to a middle portion, a hooked proximate end, and an elbow in the middle portion;

a generally rectangular sheet having a pair of adjacent corners attached to said hooked proximate ends of said pair of corner posts;

a primary adhesive strip attached to an edge of said sheet; and a complementary adhesive strip attached to a portion of a roof of the recreational camping vehicle, said complementary adhesive strip is reversibly attached to said primary adhesive strip.

2. The device of claim 1 further comprising a plurality of screws attaching together said two pair of securing brackets to the bottom platform of the sleeping unit of the recreational camping vehicle.

3. The device of claim 1 further comprising a eyelet attached to said sheet.

4. The device of claim 1 wherein each corner post having a nylon cap attached over a portion of said hooked proximate end.

5. The device of claim 1 wherein each corner post having a wood plug attached to a portion of said hooked proximate end.

6. The device of claim 1 wherein said primary adhesive strip having an exposed surface composed of a plurality of minuscule loops, and said complementary adhesive strip having a contact surface composed of a plurality of minuscule hooks, wherein when the exposed surface of said primary adhesive strip touches said contact surface of said complementary adhesive strip then a portion of said plurality of minuscule hooks interlocks together with a portion of said minuscule loops, whereby locking together said primary adhesive strip to said complementary adhesive strip.

7. The device of claim 1 wherein said primary adhesive strip having an exposed surface composed of a plurality of minuscule hooks, and said complementary adhesive strip having a contact surface composed of a plurality of minuscule loops, wherein when the exposed surface of said primary adhesive strip touches said contact surface of said complementary adhesive strip then a portion of said plurality of minuscule hooks interlocks together with a portion of said minuscule loops, whereby locking together said primary adhesive strip to said complementary adhesive strip.

8. The device of claim 1 wherein said sheet is waterproof.

9. The device of claim 1 wherein said sheet comprises a canvas sheet.

10. The device of claim 1 wherein said sheet comprises a polymeric material selected from the group consisting of rubber, neoprene, polyvinyl chloride, polyester, polypropylene, polyurethanes, polyacryls, polymethacryls, cellulosic polymers, styrene-acryl copolymers, polystyrene-polyacryl mixtures, polysiloxanes, urethane-acryl copolymers, siloxane-urethane copolymers, polyurethane-polymethacryl mixtures, silicone-acryl copolymers, vinyl acetate polymers, and mixtures thereof.

11. A kit for assembling an awning device for use as an auxiliary rain shield over a sleeping unit slidably attached to a recreational camping vehicle, said kit comprising:
  two pair of securing brackets;
  a pair of corner posts, each corner post having a flattened distal end, a clip attached to a middle portion, a hooked proximate end, and an elbow in the middle portion;
  a generally rectangular sheet;
  a primary adhesive strip; and
  a complementary adhesive strip, wherein said complementary adhesive strip is reversibly attachable to said primary adhesive strip.

12. The kit of claim 11 further comprising a plurality of screws.

13. The kit of claim 11 wherein said primary adhesive strip having an exposed surface composed of a plurality of minuscule loops, and said complementary adhesive strip having a contact surface composed of a plurality of minuscule hooks, wherein when the exposed surface of said primary adhesive strip touches said contact surface of said complementary adhesive strip then a portion of said plurality of minuscule hooks interlocks together with a portion of said minuscule loops, whereby locking together said primary adhesive strip to said complementary adhesive strip.

14. The kit of claim 11 wherein said primary adhesive strip having an exposed surface composed of a plurality of minuscule hooks, and said complementary adhesive strip having a contact surface composed of a plurality of minuscule loops, wherein when the exposed surface of said primary adhesive strip touches said contact surface of said complementary adhesive strip then a portion of said plurality of minuscule hooks interlocks together with a portion of said minuscule loops, whereby locking together said primary adhesive strip to said complementary adhesive strip.

15. The kit of claim 11 wherein said sheet is waterproof.

16. The kit of claim 11 wherein said sheet comprises a canvas sheet.

17. The kit of claim 11 wherein said sheet comprises a polymeric material selected from the group consisting of rubber, neoprene, polyvinyl chloride, polyester, polypropylene, polyurethanes, polyacryls, polymethacryls, cellulosic polymers, styrene-acrylcopolymers, polystyrene-polyacryl mixtures, polysiloxanes, urethane-acryl copolymers, siloxane-urethane copolymers, polyurethane-polymethacryl mixtures, silicone-acryl copolymers, vinyl acetate polymers, and mixtures thereof.

18. A method of using a kit for assembling an awning device for use as an auxiliary rain shield over a sleeping unit slidably attached to a recreational camping vehicle, said method comprising the steps of:
  obtaining the kit comprising:
    two pair of securing brackets;
    a pair of corner posts, each corner post having a flattened distal end, a clip attached to a middle portion, a hooked proximate end; and an elbow in the middle portion;
    a generally rectangular sheet;
    a primary adhesive strip;
    a complementary adhesive strip, wherein said complementary adhesive strip is reversibly attachable to said primary adhesive strip; and
    a plurality of screws;
  extending outwardly the sleeping unit from the recreational camping vehicle by sliding out the sleeping unit from the recreational camping vehicle;
  aligning the two pair of securing brackets onto the a bottom platform of the extended sleeping unit of the recreational camping vehicle;
  screwing on the aligned two pair of securing brackets onto the bottom platform of the extended sleeping unit with the plurality of screws;
  mounting the pair of corner posts onto the screwed on two pair of securing brackets;
  affixing the complementary adhesive strip to a portion of a roof of the recreational camping vehicle;
  adjoining together the primary adhesive strip to the sheet;
  connecting together the affixed complementary adhesive strip to the adjoined primary adhesive strip; and
  hooking together the hooked proximate ends of the mounted pair of corner posts onto the sheet.

19. The method of claim 18 further comprising the steps of:
  diconnecting the affixed complementary adhesive strip from the adjoined primary adhesive strip;
  unhooking the hooked proximate ends of the mounted pair of corner posts from the sheet;
  folding up the sheet;
  slipping off the pair of corner posts from the two pair of mounting brackets;
  storing the slipped off pair of corner posts in a storage area in the recreational camping vehicle;
  stowing the folded up sheet in the storage area in the recreational camping vehicle; and
  inserting slidably the sleeping unit into the recreational camping vehicle by sliding the sleeping unit into the recreational camping vehicle.

* * * * *